United States Patent
Leiberich et al.

(10) Patent No.: US 9,657,158 B2
(45) Date of Patent: *May 23, 2017

(54) PROCESS FOR PRODUCING BROMINATED BUTYL RUBBER

(71) Applicant: ARLANXEO Deutschland GmbH, Dormagen (DE)

(72) Inventors: Ricarda Leiberich, Neu-Isenburg (DE); Joachim Ritter, Leverkusen (DE); Hanns-Ingolf Paul, Leverkusen (DE); Udo Wiesner, Bornheim (DE); Holger Luesgen, Solingen (DE)

(73) Assignee: ARLANXEO Deutschland GmbH, Dormagen, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/810,703

(22) Filed: Jul. 28, 2015

(65) Prior Publication Data

US 2015/0329700 A1    Nov. 19, 2015

Related U.S. Application Data

(62) Division of application No. 14/233,548, filed as application No. PCT/EP2012/063993 on Jul. 17, 2012, now Pat. No. 9,127,137.

(30) Foreign Application Priority Data

Jul. 20, 2011  (EP) ..................................... 11005942
Jul. 21, 2011  (EP) ..................................... 11005975

(51) Int. Cl.
| | | |
|---|---|---|
| *C08F 220/56* | (2006.01) | |
| *C08K 5/01* | (2006.01) | |
| *C09J 115/02* | (2006.01) | |
| *C09D 115/02* | (2006.01) | |
| *C08F 8/22* | (2006.01) | |
| *C09D 7/12* | (2006.01) | |
| *C09J 11/06* | (2006.01) | |

(52) U.S. Cl.
CPC .................. *C08K 5/01* (2013.01); *C08F 8/22* (2013.01); *C09D 7/1233* (2013.01); *C09D 115/02* (2013.01); *C09J 11/06* (2013.01); *C09J 115/02* (2013.01)

(58) Field of Classification Search
CPC ........ C08K 5/01; C09J 115/02; C09D 7/1233; C09D 115/02
USPC ........................................................... 524/547
See application file for complete search history.

(56) References Cited

U.S. PATENT DOCUMENTS 5,569,723 A * 10/1996 Baade ................... B60C 1/0008
525/332.4

* cited by examiner

*Primary Examiner* — Hui Chin (57) ABSTRACT

The invention relates to an energy efficient, environmentally favorable process for the preparation of brominated butyl rubbers, that uses a bromination agent and a oxidizing agent in order to enhance the utilization of bromine contained in the bromination agent. In a preferred embodiment a common medium for both solution polymerization and subsequent bromination of the rubber is employed.

20 Claims, 1 Drawing Sheet

PROCESS FOR PRODUCING BROMINATED BUTYL RUBBER

This application is a divisional of pending U.S. patent application Ser. No. 14/233,548 filed Apr. 24, 2014, entitled "Process for producing brominated butyl rubber", which claims the right of priority under 35 U.S.C. §119 (a)-(d) and 35 U.S.C. §365 of International Application No. PCT/EP2012/063993, filed Jul. 17, 2012, which is entitled to the right of priority of European Patent Application Nos. 11005975.5, filed Jul. 21, 2011, and 11005942.5, filed Jul. 20, 2011, the contents of which are hereby incorporated by reference in their entirety.

FIELD OF THE INVENTION

The invention relates to an energy efficient, environmentally favourable process for the preparation of brominated butyl rubbers, that uses bromine or a bromine precursor or both and a oxidizing agent in order to enhance the utilization of bromine. In a preferred embodiment a common aliphatic medium for both solution polymerization and subsequent bromination of the rubber is employed.

BACKGROUND

Butyl rubbers such as isobutene-isoprene rubber (also denoted as IIR) and their halogenated analogues are an important class of synthetic rubbers.

In the conventional process for producing brominated butyl rubber (also denoted as bromobutyl rubber or BIIR) e.g. isobutene and isoprene are first polymerized in a polar halohydrocarbon medium, such as methyl chloride with an aluminum based initiating system, typically either aluminum trichloride ($AlCl_3$) or ethyl aluminum dichloride ($EtAlCl_2$). The butyl rubber does not appreciably dissolve in this polar medium, but is present as suspended particles and so this process is normally referred to as a slurry process. Residual monomers and polymerization medium are then steam stripped from the butyl rubber, before it is dissolved in a bromination medium, typically a non-polar medium such as hexane. The bromination process ultimately produces the final brominated product. The conventional process therefore employs separate polymerization and bromination steps employing two different media. The use of a polar medium for polymerization and a non-polar medium for bromination necessitates intermediate stripping and dissolving steps and is inefficient from an energy point of view.

The step of separating the monomers and methyl chloride from the butyl rubber is conducted before bromination in order to avoid the formation of highly toxic byproducts from the reaction of bromine with residual monomers. The normal boiling points of the components used in the process are: methyl chloride, −24° C.; isobutylene, −7° C.; and isoprene, 34° C. Any stripping process that removes the heavier of the residual monomers (isoprene) will also remove essentially all of the methyl chloride and isobutylene. The process of removing all of the un-reacted components from the rubber slurry requires significant amounts of energy. The greater molecular weight (and therefore higher boiling point) of the brominated monomers also precludes the removal of these species following the bromination process.

Solution processes for the polymerization of butyl rubber have been known for many years and are described for example in CA 1,019,095 and U.S. Pat. No. 3,361,725, where iso-pentane and n-hexane are used as polymerization medium and WO 2010/006983, which discloses the use of an aliphatic medium comprising at least 50 wt.-% of one or more aliphatic hydrocarbons having a boiling point in the range of 45° C. to 80° C. at a pressure of 1013 hPa as the preferred polymerization medium.

WO 2010/006983 further discloses a subsequent standard halogenation process where bromine is used as bromination agent. A major inefficiency of this process is that the theoretical fraction of bromine present in the reaction mixture which can be introduced into the polymer is at maximum 50% of the theory, and the actual utilization observed in commercial plants is usually less than 45%. Most of the remaining bromine is lost due to formation of hydrogen bromide as a by-product which, under normal conditions, does not brominate the polymer any further. Hydrogen bromide is subsequently neutralized with a basic material such as sodium hydroxide solution and washed off the bromobutyl rubber, as described for example in U.S. Pat. No. 5,077,345. As a consequence, large amounts of diluted alkali metal bromides or alkaline earth metal bromides are disposed off every year.

A known method to enhance the bromine utilization during butyl rubber bromination involves the application of at least 0.5 mol per mol of brominating agent of an oxidizing agent such as hydrogen peroxide or alkali or alkaline earth metal hypochlorite, optionally in the presence of an emulsifier which reoxidazes the hydrogen bromide back to elemental bromine. The regenerated bromine is thus available for further bromination of butyl rubber, thereby significantly increasing the bromine utilization. Such processes are disclosed for example in U.S. Pat. No. 3,018,275, U.S. Pat. No. 5,681,901 and EP 803 517 A. The utilization of bromine in U.S. Pat. No. 5,681,901 is at maximum 84% for emulsions comprising an oxidizing agent and at maximum 73% for experiments without emulsifier. The solvent used for brominations was cyclohexane.

EP 709 401 A discloses a process for improving the bromination efficiency in rubber bromination processes by carrying out the bromination reaction in the presence of elemental bromine and an aqueous solution of an organic azo compound such as azodiisobutyronitrile and/or an alkali or alkaline earth metal hypochlorite. However, there still remains a need for an efficient, environmentally favourable process for the preparation of bromobutyl rubbers that significantly reduces energy and raw material consumption and simultaneously allows to obtain brominated rubbers with a desirable microstructure.

SUMMARY OF THE INVENTIONS

There is now provided a process for the preparation of cements comprising aliphatic medium and at least one brominated butyl rubber comprising at least the steps of:
a) providing a butyl rubber cement comprising
A) 5 to 30 wt.-%, preferably 8 to 25 wt.-%, more preferably 10 to 22 wt.-% of at least one, preferably one butyl rubber
B) 0 to 5 wt.-%, preferably 0 to 0.9 more preferably 0 to 0.6 wt.-% and more preferably 0 to 0.4 wt.-% of water
C) and an amount of an aliphatic medium comprising at least 50 wt.-% of one or more aliphatic hydrocarbons having a boiling point in the range of 45.0° C. to 80.0° C. at a pressure of 1013 hPa, selected in such a manner that the sum of A), B) and C) adds up to from 96 to 100 wt.-%, preferably to from 98 to 100 wt.-% and more preferably from 99 to 100 wt.-% and even more preferably 100 wt.-% of the total amount of butyl rubber cement b) brominating the butyl rubber or the butyl rubbers contained in the butyl robber cement provided in step a) with elemental bromine in the presence of an added aqueous oxidizing agent in order to obtain a heterophasic mixture at least comprising a cement comprising aliphatic medium and brominated butyl rubber and an aqueous phase and either c) adjusting the pH-value of the aqueous phase, preferably within the heterophasic mixture obtained according to step b), to 6 to 13, preferably 8 to 12, more preferably 8 to 11 and even more preferably 9 to 10 using a base d1) separating the cement comprising aliphatic medium and brominated butyl rubber from the aqueous phase or d2) separating the heterophasic mixture obtained according so step b) to obtain the cement comprising aliphatic medium and brominated butyl rubber and so aqueous phase and d3) washing the cement comprising aliphatic medium and brominated butyl rubber with an aqueous mixture, preferably an aqueous solution of a base.

The scope of the invention encompasses any possible combination of definitions, parameters and illustrations listed herein whether in general or within areas of preference.

BRIEF DESCRIPTION OF THE DRAWING

Having summarized the invention, preferred embodiments thereof will be exemplarily described with reference to the FIGURE which shows a process flow diagram for a process according to the present invention that further depicts a preferred method of preparing the rubber cement employed in step a as well as a preferred method of isolating the brominated butyl rubber.

DETAILED DESCRIPTION

In step a) a butyl robber cement is provided which comprises

A) 5 to 30 wt.-%, preferably 8 to 25 wt.-%, more preferably 10 to 22 wt.-% of at least one, preferably one butyl rubber B) 0 to 0.9 wt.-%, preferably 0 to 0.6 and more preferably 0 to 0.4 wt.-% of water C) and an amount of an aliphatic medium comprising at least 50 wt.-% of one or more aliphatic hydrocarbons having a boiling point in the range of 45.0° C. to 80.0° C. at a pressure of 1013 hPa, selected in such a manner that the sum of A), B) and C) adds up to from 96 to 100 wt.-%, preferably to from 98 to 100 wt.-% and more preferably from 99 to 100 wt.-% of the total amount of butyl rubber cement The remainder to 100 wt.-%, where existent, may comprise or consist of for example additives and auxiliary products typically added to butyl rubbers, such as antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors which are well known to the rubber industry.

The butyl robber cement comprises at least one butyl rubber as component A). The term "butyl rubber" as used herein denotes a co-polymer comprising repeating units derived from at least one, preferably one $C_4$ to $C_7$ isoolefin and at least one, preferably one $C_4$ to $C_{14}$ conjugated diene and either no, one or more than one further co-polymerizable monomers.

Preferred $C_4$ to $C_7$ isoolefins are isobutene, 2-methyl-1-butane, 3-methyl-1-butane, 2-methyl-2-butene and mixtures thereof, whereby isobutene is more preferred.

Preferred $C_4$ to $C_{14}$ conjugated dienes are butadiene, isoprene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, 1,3-cyclohexadiene, 1-vinyl-1,3-cyclohexadiene and mixtures thereof, whereby isoprene, butadiene and cyclopentadiene are more preferred and isoprene is even more preferred.

As further co-polymerizable monomers, any monomer copolymerizable with the isoolefins and/or conjugated dienes known by the skilled in the art can be used. Preferred further co-polymerizable monomers include α-methyl styrene, p-methyl styrene, α-chlorostyrene, p-chlorostyrene indene and β-pinene.

In one embodiment, the butyl rubber comprises repeating units derived from 92.0 to 99.5, preferably 92.0 to 99.0 and more preferably 97.5 to 98.5 or 94.0 to 96.6 mol-% of at least one, preferably one $C_4$ to $C_7$ isoolefin; preferably isobutene and 0.5 to 8.0, preferably 1.0 to 8.0 and more preferably 1.5 to 2.5 or 3.5 to 6.0 mol-% as least one, preferably one $C_4$ to $C_{14}$ conjugated diene, preferably isoprene.

In one further embodiment, the butyl rubber comprises repeating units derived from i) at least one, preferably one $C_4$ to $C_7$ isoolefin; preferably isobutene ii) 0.5 to 8.0, preferably 1.0 to 8.0 and more preferably 1.5 to 2.5 or 3.5 to 6.0 mol-% at least one, preferably one $C_4$ to $C_{14}$ conjugated diene, preferably isoprene and iii) 0.1 to 20, preferably 1 to 20 wt.-% of further co-polymerizable monomers whereby the repeating units derived from i), ii) and iii) add up to 100 mol-% of the repeating units contained in the butyl rubber.

Particularly preferred butyl rubbers are copolymers of isobutene and isoprene comprising 1.5 to 2.5 mol-% repeating units derived from isoprene.

Preferably, the mass average molecular weight of butyl rubber Mw is between 30,000 and 2,000,000 g/mol, preferably between 50,000 and 3,000,000 g/mol more preferably between 300,000 and 1,000,000 g/mol and even more preferably from 350,000 to 600,000 g/mol, yet more preferably 375,000 to 550,000 g/mol and most preferably 400,000 to 500,000 g/mol. If not mentioned otherwise, molecular weights are obtained using gel permeation chromatography in tetrahydrofuran (THF) solution using polystyrene molecular weight standards.

As component C) of the cement provided in step a) of the process according to the invention an aliphatic medium comprising at least 50 wt.-% of one or more aliphatic hydrocarbons having a boiling point in the range of 45.0° C. to 80.0° C. at a pressure of 1013 hPa is employed. It was found that the use of a solvent having a higher content or consisting of compounds having a boiling point of more than 80.0° C. at 1013 hPa would cause difficulties in the separation from the rubber after bromination. The solution viscosity provided by use of such solvents is then significantly higher making the solution more difficult to handle and to separate in step d).

In one embodiment of the invention the aliphatic medium comprises at least 80 wt.-% of one or more aliphatic hydrocarbons having a boiling point in the range of 45.0° C. to 80.0° C. at a pressure of 1013 hPa, preferably at least 90 wt.-%, even more preferably at least 95 wt.-% and yet even more preferably at least 97 wt.-%. Aliphatic hydrocarbons having a boiling point in the range of 45.0° C. to 80.0° C. at a pressure of 1013 hPa include cyclopentane, 2,2-dimethylbutane, 2,3-dimethylbutane, 2-methylpentane, 3-methylpentane, n-hexane, methylclopentane and 2,2-dimethylpentane.

The aliphatic medium may either further comprise other compounds which are at least substantially inert under bromination conditions or not. Such as other compounds which are at least substantially inert under bromination conditions include aliphatic hydrocarbons having a boiling point of more than 80.0° C. at a pressure of 1013 hPa including cyclohexane, n-heptane and n-octane and aliphatic hydrocarbons having a boiling point of less than 45.0° C. at a pressure of 1013 hPa including propanes, butanes and acyclic pentanes, furthermore halohydrocarbons such as methyl chloride and other chlorinated aliphatic hydrocarbons which are at least substantially inert under bromination conditions as well as hydrofluorocarbons whereby hydrofluorocarbons are for example those represented by the formula; $C_xH_yF_z$ wherein x is an integer from 1 to 20, alternatively from 1 to preferably from 1 to 3, wherein y and z are integers and at least one.

In another preferred embodiment of the invention the aliphatic medium is substantially free of halohydrocarbons.

In another embodiment of the invention the aliphatic medium has a content of cyclic aliphatic hydrocarbons of less than 25 wt.-%, preferably less than 20 wt.-%, more preferably of from 0.05 to 20 wt.-%, even more preferably of from 5 to 20 wt.-%.

In another embodiment of the invention the aliphatic medium has a content of cyclohexane (boiling point: 80.9° C. at 1013 hPa) of less than 5 wt.-%, preferably less than 2.5 wt.-%.

As used hereinbefore and hereinafter the term "substantially free of halohydrocarbons" means a content of halohydrocarbons within the common aliphatic medium of less than 2 wt.-%, preferably less than 1 wt.-%, more preferably less than 0.1 wt.-% and even more preferably absence of halohydrocarbons.

The butyl rubber cement employed in step a) contains from 0 to 0.9 wt.-%, preferably 0 to 0.6 wt.-% and more preferably 0 to 0.4 wt.-% of water. This amount of water typically results from air humidity or traces of water present in the aliphatic medium but may, even though not preferred, be added to the butyl rubber cement.

The butyl rubber cement may be prepared by dissolving butyl rubber in the aliphatic medium, or by solvent replacement as disclosed in U.S. Pat. No. 5,021,509, which is herein incorporated by reference. In a preferred embodiment however, the butyl rubber cement employed in step a) is prepared in process comprising at least the steps of pre-a1) providing a reaction medium comprising an aliphatic medium comprising at least 50 wt.-% of one or more aliphatic hydrocarbons having a boiling paint in the range of 45° C. to 80° C. at a pressure of 1013 hPa, and a monomer mixture comprising at least one $C_4$ to $C_7$ isoolefin, at least one $C_4$ to $C_{14}$ conjugated diene and either no one or more than one further co-polymerizable monomers.

In a mass ratio of monomer mixture to aliphatic medium of from 35:65 to 99:1, preferably from 50:50 to 85:15 and even more preferably from 61:39 to 80:20;

pre-a2) polymerizing the monomer mixture within the reaction medium to form a butyl rubber solution comprising a butyl rubber which is at least substantially dissolved in the medium comprising the aliphatic medium and residual monomers of the monomer mixture;

pre-a3) separating residual monomers of the monomer mixture from the butyl rubber solution to form the butyl rubber cement, whereby the separation is preferably performed by distillation.

As used hereinabove the term "at least substantially dissolved" means that at least 70 wt.-%, preferably at least 80 wt.-%, more preferably at least 90 wt.-% and even more preferably at least 95 wt.-% of the butyl rubber polymer obtained according to step b) are dissolved in the medium.

It is within the scope of the present invention that the composition of the aliphatic medium may have a slightly varying composition before and after removal of the un-reacted monomers due to different boiling points of its components. In an optional step pre-a4) additional aliphatic medium of the same or different composition as employed in step pre-a1) may be added to the butyl rubber cement obtained in step pre-a3) in order to adjust the butyl rubber concentration or the aliphatic medium composition.

Since the aliphatic medium employed in step pre-a1) is used as solvent in the polymerization according to step pre-a3) as well as in the subsequent bromination of step b) the overall energy efficiency and raw material utilization of the process is further improved by eliminating the need to separate the butyl rubber from a first diluent or solvent used for polymerization, then re-dissolve it in a second solvent for bromination. This integrated process therefore provides improved energy and raw material efficiency and a reduction in the number of process steps as compared with conventional non-integrated processes for making brominated butyl rubbers.

It was further found that the specific composition of the aliphatic medium further allows to reduce the solution viscosity in the polymerization process which is typically performed at low temperatures.

In an embodiment of the invention the polymerization according to step pre-a2) and the provision of a solution according to step pre-a1) is effected using a solution polymerization reactor. Suitable reactors are those known to the skilled in the art and include commonly known flow-through polymerization reactors.

Step pre-a3) of the process may employ distillation to separate un-reacted residual monomers, i.e. the isoolefin monomers and the mutliolefin monomers from the medium. This mitigates the formation of undesirable bromination byproducts from the unreacted monomers, if steps pre-a1) to pre-a3) are used to prepare the butyl rubber cement to be employed in step a) and distillation is employed to perform step pre-a3) the to $C_4$ to $C_7$ isoolefins and $C_4$ to $C_{14}$ conjugated dienes and the optional further co-polymerizable monomers employed are limited to those having a boiling point below 80.0° C. at a pressure of 1013 hPa, preferably below 60.0° C. at a pressure of 1013 hPa, more preferably below 45.0° C. at a pressure of 1013 hPa and even more preferably below 40.0° C. at a pressure of 1013 hPa.

It is clear that the boiling point of the monomers may be higher than 45.0° C. at a pressure of 1013 hPa, if the aliphatic medium comprises aliphatic hydrocarbons having a boiling point which is higher than that of the highest boiling component of the monomer mixture but still below 80.0° C. at a pressure of 1013 hPa.

The specific ratio of monomers necessary in step pre-a1) to obtain a butyl rubber according to the specifications given in specific embodiments of step a), in particular with respect to Mw and monomer incorporation depends on several factors such as temperature and initiator employed in step pre-a1), the exact solvent composition and viscosity just to name a few and which are well known to those skilled in the art. However, the best way to obtain a desired butyl rubber may be easily determined by very few routine experiments.

The polymerization in step pre-a2) is initiated by at least one polymerization initiator, which are for example selected from the group of cationic initiators, whereby the term cationic initiator denotes and includes initiators capable of initiating cationic polymerizations.

Suitable cationic initiators are those producing protons, carbocations or silylium cations capable of initiating cationic polymerizations.

Such cationic initiators include but are not limited to reaction products of at least one lewis acid such as aluminum trihalides such as aluminium trichloride, titanium halides such as titanium tetrachloride, stannous halides such as stannous tetrachloride, boron halides such as boron trifluoride and boron trichloride, antimony halides such as antimony pentachloride or antimony pentafluoride or at least one organometal compound such as dialkylaluminum halides such as diethylaluminum chloride, alkylaluminum dihalides such as ethylaluminum dichloride or a mixture of the aforementioned lewis acids and/or organometal compounds and at least one proton source such as water, alcohols such as $C_1$ to $C_{12}$ aliphatic alcohols like methanol, ethanol or isopropanol, phenols, carboxylic acids, sulfonic acids, thiols or inorganic acids such as dihydrogensulfide, hydrogen chloride, hydrogen bromide or sulphuric acid carbocationic compounds of formula (I)

$$[CR^1R^3R^3]^-An^{31} \quad (I)$$

wherein $R^1$, $R^2$ and $R^3$ are independently hydrogen, $C_1$-$C_{20}$-alkyl or $C_5$-$C_{20}$-aryl with the proviso that either one or none of $R^1$, $R^2$ and $R^3$ is hydrogen and $An^-$ denotes a monoanion or 1/p equivalent of a p-valent anion or silylium compounds of formula (II)

$$[SiR^1R^2R^3]^+An^- \quad (II)$$

wherein $R^1$, $R^2$ and $R^3$ and $An^-$ have the same meaning as set forth above for formula (I)

or mixtures of the aforementioned compounds and reaction products

The preferred molar ratio of lewis acids or organometal compounds and the proton sources is in the range of from 1:0.0001 to 1:5, preferably from 1:0.5 to 1:3 and more preferably from 1:0.5 to 1:2.

In formulae (I) and (II) $R^1$, $R^2$ and $R^3$ are preferably independently selected from the group consisting of phenyl, tolyl, xylyl and biphenyl, methyl, ethyl, n-propyl, n-butyl, n-pentyl, n-hexyl, cyclohexyl, n-octyl, n-nonyl, n-decyl, n-dodecyl, 3-methylpentyl and 3,5,5-trimethylhexyl.

In formulae (I) and (II) $An^-$ preferably denote an anion of formula (III)

$$[M(R^4)_4]^- \quad (III)$$

wherein

M is boron, aluminum, gallium or indium in the +3 formal oxidation state and $R^4$ is independently, more preferably identically, selected from the group consisting of hydride, dialkylamido, halide such as chloride, $C_1$-$C_{20}$-alkyl or $C_3$-$C_{20}$-aryl, $C_1$-$C_{20}$-haloalkyl or $C_5$-$C_{20}$-haloaryl.

Preferred cationic initiators are reaction products of at least one lewis acid such as aluminum trihalides such as aluminium trichloride, titanium halides such as titanium tetrachloride, stannous halides such as stannous tetrachloride, boron halides such as boron trifluoride and boron trichloride, antimony halides such as antimony pentachloride or antimony pentafluoride or at least one organometal compound such as dialkylaluminum halides such as diethylaluminum chloride, alkylaluminum dihalides such as ethylaluminum dichloride or a mixture of the aforementioned lewis acids and/or organometal compounds and at least one proton source such as water, alcohols such as $C_1$ to $C_{12}$ aliphatic alcohols such as methanol, ethanol and isopropanol, phenols, carboxylic acids, sulfonic acids, thiols or inorganic acids such as dihydrogensulfide, hydrogen chloride, hydrogen bromide or sulphuric acid as cationic initiator and More preferred cationic initiators are reaction products of diethylaluminum chloride or ethylaluminum dichloride or mixtures thereof with at least one proton source such as water, alcohols such as $C_1$ to $C_{12}$ aliphatic alcohols like methanol, ethanol and isopropanol, phenols, carboxylic acids, thiols or inorganic acids such as dihydrogensulfide, hydrogen chloride, hydrogen bromide or sulphuric acid is used, whereby water and hydrogenchloride are even more preferred and water is particularly preferred.

The preferred molar ratio of diethylaluminum chloride or ethylaluminum dichloride or mixtures thereof with such proton sources or preferably hydrogen chloride and water and more preferably water is in the range of from 1:0.01 to 1:3, more preferably from 1:0.5 to 1:2.

Particularly preferred cationic initiators are reaction products of mixtures of diethylaluminum chloride and ethylaluminum dichloride, in particular the 1:1 molar mixture which is also called ethylaluminum sesquichloride with hydrogen chloride or water, preferably water, whereby amount of water or hydrogen chloride to aluminium is between 50 and 200 mol-%.

The polymerization initiators comprising diethylaluminum chloride and ethylaluminum dichloride are typically and preferably employed as 0.5-10 wt % solution in hexane in an amount of from 0.0001 to 20 wt.-%, more preferably 0.01 to 10 wt.-% and even more preferably 0.05 to 5 wt.-% of the reaction medium employed in step pre-a2).

In general the polymerization initiators are preferably employed in an amount of from 0.0001 to 20 wt.-%, more preferably 0.01 to 10 wt.-% and even more preferably 0.02 to 5 wt.-% of the reaction medium employed in step pre-a2).

In one embodiment, the process temperature of step pre-a2) is in the range of −100° C. to −40° C. preferably in the range of −95° C. to −60° C., more preferably in the range of −80° C. to −60° C.

Although higher temperatures are desirable in that energy usage for refrigeration and pumping (due to lower viscosity at higher temperature) are reduced, this generally leads to lower molecular weight polymers that are not as commercially desirable. However, due to the use of high monomer to aliphatic medium ratios in the present invention, a reduced but still acceptable molecular weight can be obtained with higher temperatures.

Therefore, in an alternative embodiment, temperatures in the range of −50° C. to lower than −75° C., preferably −55° C. to −72° C. more preferably −59° C. to −70° C., yet more preferably −61° C. to −69° C., are used while still obtaining the desired molecular weight of butyl rubber.

The viscosity of the butyl rubber solution obtained in step pre-a2) at the temperature employed for polymerization is preferably less than 2000 cP, preferably less than 1500 cP, more preferably less than 1000 cP. A most preferred range of viscosity is from 500 to 1000 cP. All given viscosities refer to the extrapolated zero shear viscosity. The Zero shear viscosity is extrapolated from measurements at given temperature using a Haake Rheostress RS 150 viscosimeter or a rotational rheometer of cone-plate type for very viscous samples. The extrapolation is performed by taking a best fitting $2^{nd}$ order polynomial to reflect the shear stress vs shear rate graph obtained from the measurements. The linear portion of the polynomial reflects the slope at a shear rate of zero and thus is the zero shear viscosity.

The solids content of the butyl rubber solution obtained in step pre-a2) is preferably in the range of from 3 to 25%, more preferably 10 to 20%, even more preferably from 12 to 18%, yet more preferably from 14 to 18%, even more preferably from 14.5 to 18%, still more preferably 15 to 18%, most preferably 16 to 18% by weight. As described previously, higher solids contents are preferred, but entail increased solution viscosity. The higher monomer to aliphatic medium ratios used in the present process allow higher solids contents to be achieved than in the past and advantageously also permit use of the aliphatic medium for both polymerization and bromination.

As used herein the term "solids content" refers to weight percent of the polymer obtained according to step pre-a2) i.e. in polymerization and present in the rubber solution.

In step pre-a3), un-reacted residual monomers are removed from the solution following polymerization. This is preferably done using a distillation process. Distillation processes to separate liquids of different boiling points are well known in the art and are described in, for example, the *Encyclopedia of Chemical Technology*, Kirk Othmer, 4th Edition, pp. 8-311, which is incorporated herein by reference.

The degree of separation is largely dependent upon the number of trays used in the column. An acceptable and preferred level of residual monomers in the solution following separation is less than 20 parts per million by weight. About 40 trays have been found sufficient to achieve this degree of separation. Separation of the aliphatic medium from the monomers is not critical and contents of for example up to 10 wt.-% of components of the aliphatic medium are acceptable in the overhead stream from the distillation process. In a preferred embodiment the contents of components of the aliphatic medium in the overhead stream from the distillation process are less than 5 wt.-%, more preferably less than 2 wt.-%, even more preferably less than 1 wt.-%.

In one embodiment the monomers removed in step pre-a3) are recycled into step pre-a1), preferably after purification. Purification of monomers may be carried out by passing them through adsorbent columns containing suitable molecular sieves or alumina containing adsorbent materials. In order to minimize interference with the polymerization reaction, the total concentration of water and substances such as alcohols and other organic oxygen containing compounds that act as poisons to the reaction are preferably reduced to less than 50 parts per million, preferably less than 10 parts per million on a weight basis. The proportion of monomers that are available for recycle depends on the degree of conversion obtained during the polymerization process. For example, taking a ratio of monomer to aliphatic medium of 66:34, if the solids level in the rubber solution produced is 10%, then 85% of the monomers are available to be returned in the recycle stream. If the solids level is increased to 18%, then 73% of the monomers are available for recycle.

In a preferred embodiment the polymerization according to step pre-a2) is carried out continuously.

In a preferred embodiment the preparation of the butyl rubber cement according to steps pre-a1) to pre-a3) is carried out continuously.

In step b) according to the invention the butyl rubber or the butyl rubbers contained in the butyl rubber cement provided in step a) are brominated with elemental bromine in the presence of an added aqueous oxidizing agent. Bromine ($Br_2$) reacts with the butyl rubber polymer to form brominated butyl rubber and hydrogen bromide which is then by the added aqueous oxidizing agent reoxidized to elemental bromine which can further brominate the butyl rubber again forming hydrogen bromide. This bromination-reoxidation cycle ideally is repeated until all of the available bromine is incorporated into the polymer. Processes known in the art, however, only allow to utilize sources of bromine to at maximum of 84% as described above.

The elemental bromine necessary to initiate bromination may be either
  added to the butyl rubber cement either in substance or as solution of elemental bromine, preferably as solution in the aliphatic medium, more preferably in substance or
  either additionally or alternatively formed by reaction of hydrogen bromide or metal bromides or mixtures of hydrogen bromide or metal bromides as bromine precursors with the aqueous oxidizing agent in situ.

Preferred metal bromides are alkaline metal, alkaline earth metal or zinc bromide whereby sodium, potassium and zinc bromide are more preferred and sodium bromide is even more preferred.

Where bromine employment of aqueous solutions of hydrogen bromide or metal bromides or mixtures of hydrogen bromide or metal bromides are preferred.

Even more preferred is the employment of concentrated or even saturated aqueous solutions of metal bromides and the azeotropic mixture of hydrogen bromide and water comprising 48 wt.-% of hydrogen bromide.

In a preferred embodiment elemental bromine and an aqueous oxidizing agent are added to the butyl rubber cement.

The aqueous oxidizing agent may be added to the butyl rubber cement prior to, concurrently with or subsequent to the addition of elemental bromine or the bromine precursors.

In a preferred embodiment the aqueous oxidizing agent is added prior to elemental bromine or the bromine precursors, preferably bromine to allow its dispersal throughout the reaction medium. The aqueous oxidizing agents which have been found suitable for the purposes of the present invention are solutions of water soluble peroxides in water which are capable to oxidize hydrogen bromide or bromide ions to elemental bromine. Preferred water soluble peroxides are exemplified by the following substances: hydrogen peroxide and hydrogen peroxide-forming compounds, such as peracids, alkali metal peroxides and adducts of hydrogen peroxide and alkali metal salts such as sodium percarbonate, whereby aqueous solutions of hydrogen peroxide are even more preferred.

Preferred aqueous solutions of hydrogen peroxide are those comprising 25 to 60 wt.-%, preferably 28 to 38 wt.-%, more preferably 32 to 37 wt.-%, even more preferably 34 to 36 wt.-% of hydrogen peroxide.

It was found that the lower the water content in the cement is, the better the bromine utilization and oxidation performance with hydrogen peroxide is.

The weight ratio of water soluble peroxides, in particular hydrogen peroxide, to water within the reaction mixture formed by adding the aqueous oxidation agent to the butyl rubber cement is initially therefore preferably higher than 0.05, more preferably higher than 0.12, more preferably higher than 0.14. It is clear that the weight ratio of water soluble peroxides, in particular hydrogen peroxide, to water within the reaction mixture decreases with proceeding consumption of the oxidizing agent.

In another embodiment the quantity of bromine atoms employed in form of elemental bromine or bromine precursor or bromine and bromine precursor, preferably only elemental bromine is 0.2 to 1.2 times the molar quantity of double bonds contained in the butyl rubber, preferably 0.3 to 1.0, more preferably 0.6 to 1.0 times the molar quantity.

The aqueous oxidizing agents may either be used in combination with surfactants or not. In a preferred embodiment no surfactants are added.

Suitable surfactants, if employed, are for example $C_6$-$C_{24}$-alkyl- or $C_6$-$C_{14}$-aryl-sulfonic acid salts, fatty alcohols and ethoxylated fatty alcohols and the like.

The amount of oxidizing agent used in accordance with the invention depends on the amount and kind of bromine source used.

For example from 0.6 to about 5 mol of aqueous oxidizing agent calculated on hydrogen peroxide per mol of elemental bromine may be used, preferably from 0.8 to 3 mol and more preferably from 0.8 to 1.2 mol and even more preferably from 1.0 to 1.2 mol.

If hydrogen bromide or metal bromides as bromine precursors are used from 1 to about 5 mol of aqueous oxidizing agent calculated on hydrogen peroxide per mol of bromide contained in the bromine precursors may be used, preferably from 1.5 to 3 mol and more preferably from 1.5 to 2.4 mol and even more preferably from 1.8 to 2.1 mol.

The bromination process may be operated at a temperature of from 0° C. to 90° C., preferably from 20° C. to 80° C. and even more preferably 40 to 70° C. and the reaction time may for example be from 1 minute to 24 hours, preferably 1 minute to 1 hour, more preferably from 10 to 30 minutes. The pressure in the bromination reactor may be from 0.08 to 1 mPa.

Agitation of course supports to mix the reactants. In one embodiment the mechanical power input is 0.5 W/l of reaction medium (i.e. the butyl rubber cement, the added aqueous oxidizing agent and the bromine or the bromine precursor) or above, preferably 0.7 W/l or above.

Agitation is preferably effected by stirrers and mixers known to those skilled in art.

The mechanical power input of stirrers and mixers can for example be determined by measuring the electrical power consumption at a certain rotational speed once in the reaction medium and once in air and taking the difference.

In a preferred embodiment the bromination according to step b) is carried out continuously for example using a commonly known flow-through halogenation reactor.

In a further preferred embodiment the process according to step b) and c) is carried out continuously.

In a further preferred embodiment the process according to steps b), c) and d) is carried out continuously.

The amount of bromination during this procedure may be easily controlled so that the final polymer has the preferred amounts of bromine described hereinabove.

In step c) the pH-value of the aqueous phase within the heterophasic mixture obtained according to step b) is adjusted to 6 to 13, preferably 8 to 12, more preferably 8 to 11 and even more preferably 9 to 10 using a base.

Throughout this application the term pH-value denotes a pH-value measured at 25° C.

The heterophasic mixture at least comprising a cement comprising aliphatic medium and brominated butyl rubber and an aqueous phase obtained in step b) is typically acidic due to formation of hydrogen bromide during the bromination process. The adjustment of the pH-value neutralizes residual hydrogen bromide, bromine and hydrogen peroxide and as was found here, prevents in particular for pH-values of 8 to 12, preferably 8 to 11 and even more preferably 9 to 10 the post-halogenation degradation of the brominated butyl rubber, which negatively impacts colour, mooney viscosity and molecular weight.

The adjustment is typically made with bases such as aqueous solutions or slurries of alkaline or earth alkaline metal hydroxides or carbonates, preferably with aqueous solutions of alkaline metal hydroxides such as sodium and potassium hydroxide, whereby sodium hydroxide is preferred.

If step d3) is applied the cement comprising aliphatic medium and brominated butyl rubber is washed with an aqueous mixture, preferably an aqueous solution of a base. The pH-value of the aqueous phase may for example be 8 to 14, preferably 10 to 14, more preferably 12 to 14 and even more preferably 12 to 13.5.

Throughout this application the term pH-value denotes a pH-value measured at 25° C.

Suitable bases include inorganic and organic bases, whereby inorganic bases like metal carbonates and hydroxides are preferred. Alkaline or earth alkaline metal hydroxides or carbonates are particularly preferred. Most preferred are aqueous solutions of sodium hydroxide.

In steps d1) or d2) the cement comprising aliphatic medium and brominated butyl rubber is separated from the aqueous phase. This can be done in any separation device known to those in the art. In one embodiment the separation is effected continuously in a separating apparatus comprising a settling section whereby the separation is preferably supported by means of a coalescer. Suitable examples of coalescers include structured or unstructured packings. Structured packings are for example flat plates, flat vanes, roof-shaped vanes and vanes with holes in vertical direction. The vanes or plates may be positioned rectangular or parallel to the main flow direction or with a slope. Unstructured packings are for example wire mesh, packings made of rings, spheres, cylinders, irregularly shaped geometries and weirs like distributor plates that have holes or slits, vertical plates covering a portion of the main flow path. The packings can be made of any technically feasible material, e.g. metals, glass, ceramic, coated metals, lined metals and polymeric materials like for example PTFE, ETFE, polyethylene (PE), polyetheretherketone (PEEK), Polypropylene (PP), polyamide (PA) and polyvinylidenfluoride (PVDF).

In an optional but preferred step e) volatile components having a boiling point below 250° C. at 1013 hPa are removed from the brominated butyl rubber to obtain the brominated butyl rubber in solid form, whereby the residual content of such volatile components is preferably below 2000 ppm more preferably below 3000 ppm and even more preferably below 500 ppm.

In one embodiment this may be effected by steam stripping or precipitation for example using a lower alcohol such as isopropanol, followed by drying. In another preferred embodiment of step e) is performed as disclosed in WO2010/031823 by means of an extruder, preferably a twin screw extruder. Between steps d) and e) a standard washing step may be applied.

The brominated rubber may cured in a further step. The curing of brominated rubbers is well known.

Suitable curing systems for use with the present product are those already known in the art for use with brominated butyl rubbers and generally include conventional curing systems such as sulphur, resin and peroxide curing systems.

The brominated rubbers and cured brominated rubbers obtainable using the process according to the invention may be used as tyre inner liners, treads, sidewalls, adhesives, blends with thermoplastic elastomers, footwear, storage membranes, protective clothing, pharmaceutical stoppers, linings, and barrier coatings or be used in a process for the preparation thereof. The brominated rubber cements and brominated rubbers may further be used to prepare ionomers and polymer nanocomposites comprising filler and ionomers.

The brominated butyl rubbers obtainable according to the invention whether in isolated form or as cement obtained in step d) exhibit a very high content of exo-double bonds with bromine in allylic position which facilitates cross-linking in commercial applications.

The share of bromine atoms being in allylic position to exo-double bonds as measured by 1H-NMR typically exceeds 40% or even 50% with respect to the total bromine content of the brominated butyl rubber as measured by XRF.

Figure 1:
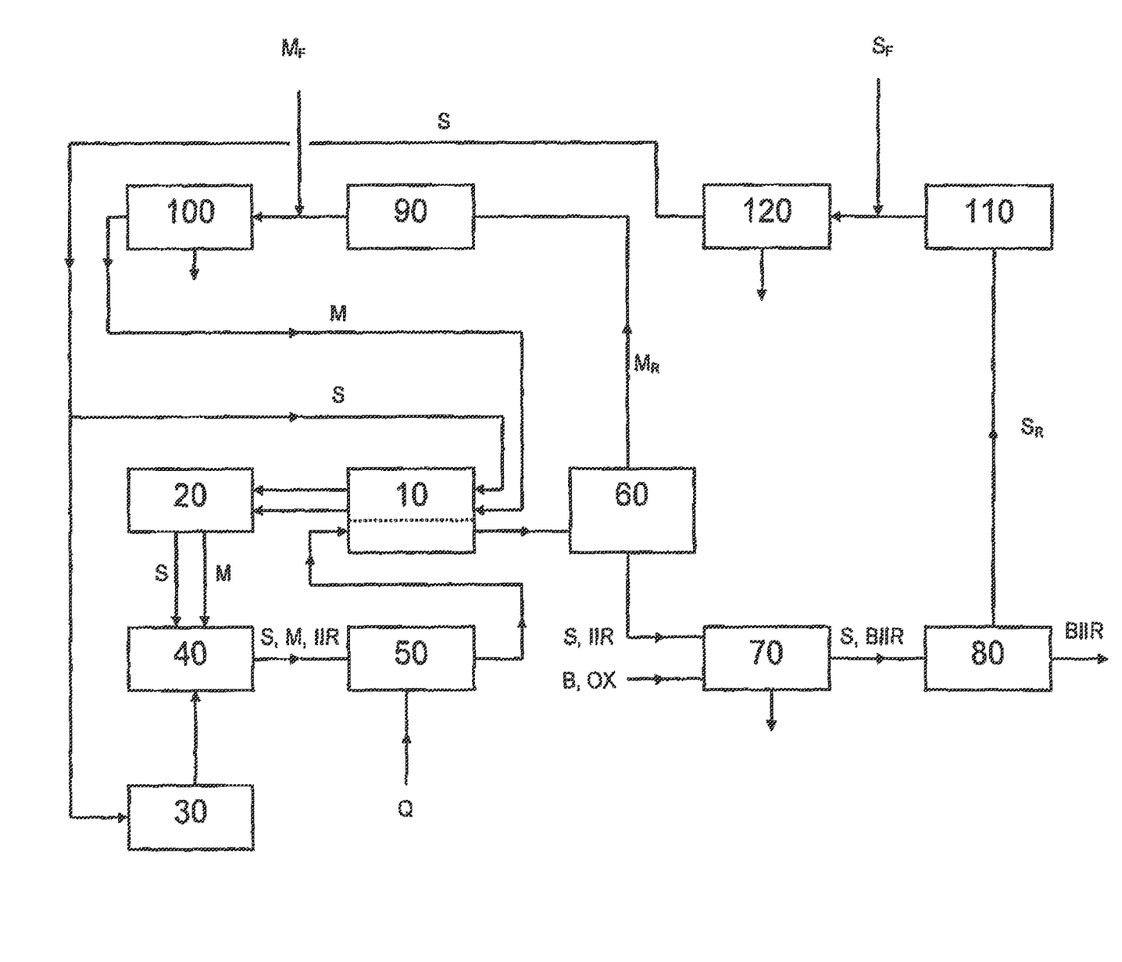

Referring to the FIGURE, a solution polymerization reactor 40 is provided with a feed of monomers M, comprising isoprene and isobutylene, and a feed of the aliphatic medium S via an optional heat exchanger 10, preferably a recuperative heat exchanger, and feed cooler 20. The monomers may either be pre-mixed with the aliphatic medium or mixed within the polymerization reactor 40. The initiator solution, comprising a carbocationic initiator-activator system of the type used for butyl rubber polymerizations is pre-mixed with the aliphatic medium S in a initiator preparation unit 30 and also introduced to the reactor 40. The solution polymerization is then allowed to occur within the polymerization reactor 40. Solution polymerization reactors 40 of a type suitable for use in the present integrated process, along with process control and operating parameters of such reactors, are described, for example, in EP 0 053 585 A, which is herein incorporated by reference. Conversion is showed to proceed to the desired extent and then a reaction stopping agent Q, for example water or an alcohol such as methanol, is added and mixed into the reactor discharge stream comprising the aliphatic medium S, un-reacted monomers M and butyl rubber IIR its mixer 50. The resulting polymer solution comprising un-reacted monomers M i.e. isoprene and isobutylene, the aliphatic medium S and butyl rubber IIR is passed through a recuperative heat exchanger 10 where it is warmed by the incoming feeds to the reactor, while at the same time helping to cool these feeds before they enter the final feeds cooler 20. The warmed polymer solution is then directed to a distillation column 60 for removal of the un-reacted monomers. Once the un-reacted monomers have been separated as recycling stream $M_R$, they exit from the top of the column 60 and the separated butyl rubber cement (S, IIR) exits from the bottom of the column 60 to a solution bromination reactor 70. Additional aliphatic medium S may be provided to the bromination reactor 70 in order to provide the desired conditions for bromination. A feed of bromine or a bromine precursor B and an oxidizing agent OX is also provided to the bromination reactor 70. The bromobutyl rubber (BIIR) exits the reactor as brominated rubber cement (S, BIIR) and is then finished using finishing equipment 80, as is conventionally known, preferably an extruder. The aliphatic medium removed during the finishing step is sent as recycling stream $S_R$ to solvent recovery 110 prior to introduction to solvent purification section 120. Additional aliphatic medium $S_F$ may be added before purification 120 or afterwards, if the medium has already been pre-purified. The purified common aliphatic medium is recycled back to the recuperative heat exchanger 10 and final feed cooler 20 for re-use in rise process. The unreacted monomers separated from the polymer solution in the distillation column 60 are sent as recycle stream $M_R$ to monomer recovery unit 90 and are then purified in monomer purification section 100 prior to being recycled back to the recuperative heat exchanger 10 and feed cooler 20. Additional fresh monomers $M_F$ may be added either prior to monomer purification 100 or afterwards, if the monomers have been pre-purified. The description of the process given hereinabove is exemplary and can be applied to all common aliphatic media compositions as well as to all monomer and product compositions mentioned herein.

It is within the scope of the present invention that the composition of the aliphatic medium may have a slightly varying composition before and after removal of the un-reacted monomers due to different boiling points of its components.

EXAMPLES

Example 1—Polymerization and Distillation

A reactor of 4 liter total capacity was run in a continuous mode. Feeds to the reactors were 6.438 kg/h of isobutene, 0.150 kg/h of isoprene and 5.382 kg/h of an aliphatic medium comprising
- 2.0 wt.-% butanes and pentanes having a boiling point below 45° C. at a pressure of 1013 hPa,
- 97.5 wt.-% pentanes and hexanes having a boiling point in the range of 45° C. to 80° C. at a pressure of 1013 hPa,
- 0.5 wt.-% hexanes, heptanes and octanes having a boiling point above 80° C. at a pressure of 1013 hPa, whereby the aliphatic medium comprises less than 20 wt.-% of cyclic aliphatic compounds resulting in a monomer/aliphatic medium mass ratio of 55:45.

As initiator, a 1.5 wt.-% 1:1 molar mixture of diethylaluminum chloride and ethylaluminumdichloride solution in n-hexane activated with 100 mol-% of water based on the aluminium content was used in an amount of 35 g/h.

The reaction temperature used was −65° C. and a solution having a solids content of 14 to 15 wt % was produced. This material had a weight average molecular weight of about 420 kg/mol and an isoprene content of about 1.8 mol-%. The solution from the reactors was fed to a distillation column with 40 trays and separation of the monomers from the rubber solution was performed. The solution was preheated to 42° C. and a re-boiler was used at the bottom of the column to maintain a bottom temperature of 113° C. A reflux condenser was used to return part of the overhead stream to the top of the column maintaining a temperature there of 36° C. The separation achieved in the column left less than 10 ppm of residual isoprene monomer in the separated rubber solution and 1.2% of aliphatic medium in the overhead monomer stream. The separated monomers were purified, then re-introduced to the solution polymerization reactor. The butyl rubber cement thus obtained contained 18 wt.-% butyl rubber in the aliphatic medium. The water content of the butyl rubber cement was below 0.1 wt.-%.

Example 2—Halogenation with Elemental Bromine

The butyl rubber cement of Example 1 was halogenated using pilot scale batch bromination equipment. A 35 wt.-% hydrogen peroxide solution in water (at a molar ratio of 1.1:1 with bromine to be added) was introduced into this solution and the resulting mixture was agitated at 45° C. for up to 2 minutes prior to the addition of elemental bromine. The amount of bromine added was 21.0 kg per ton of butyl rubber. After a reaction period of up to 20 minutes, sodium hydroxide solution was added to the reaction mixture to neutralize any residual hydrogen bromide, bromine and hydrogen peroxide and to adjust the pH-value to 9.5. The resulting brominated butyl rubber cement was rinsed with water in a 1:1 mass ratio.

Antioxidants (irganox), stabilizers (paraplex) and calcium stearate were dispersed in the cement before steam injection was used to remove residual solvent. The resulting polymer was dried using a hot mill until less than 0.1% mass loss was achieved, and analyzed using proton NMR to determine the microstructure. The NMR results are tabulated below. Values are given in mol %.

| unchanged double bonds derived from 1,4 isoprene incorporation | exo-double bonds with bromine in allylic position |
|---|---|
| 0.80 | 0.73 |

The brominated butyl rubbers obtainable according to the invention exhibit a high content of exo-double bonds with bromine in allylic position which facilitates cross-linking in commercial applications.

The bromine incorporation into the polymer as determined by XRF was 18.0 kg/ton resulting in a bromine utilization of 85.7%.

Example 3—Halogenation With 48 wt % HBr in Water

The butyl rubber cement of example 1 was halogenated using pilot scale batch bromination equipment. A 35 wt.-% hydrogen peroxide solution in water (at a molar ratio of 2.05:1 with HBr to be added) was introduced into this solution and the resulting mixture was agitated at 45° C. for up to 2 minutes prior to the addition of 48% wt hydrogen bromide in water. The amount of hydrogen bromine (48% by weight) added was 49 kg per ton of butyl rubber.

After a reaction period of 3 minutes, sodium hydroxide solution was added to the reaction mixture to neutralize any residual hydrogen bromide, bromine and hydrogen peroxide and to adjust the pH-value to 9.5. The resulting brominated butyl rubber cement was rinsed with water in a 1:1 mass ratio.

Antioxidants (irganox), stabilizers (paraplex) and calcium stearate were dispersed in the cement before steam injection was used to remove residual solvent. The resulting polymer was dried using a hot mill until less than 0.1% mass loss was achieved, and analyzed using proton NMR to determine the microstructure. The NMR results are tabulated below. Values are given in mol %.

| unchanged double bonds derived from 1,4 isoprene incorporation | exo-double bonds with bromine in allylic position |
|---|---|
| 0.71 | 0.74 |

The bromine incorporation into the polymer as determined by XRF was 18.0 kg/ton resulting in a bromine utilization of 76.5%.

Example 4—Continuous Halogenation With Elemental Bromine

The butyl rubber cement of example 1 was halogenated using a continuous pilot scale bromination equipment. The equipment with is used based on a high-shear mixer in combination with an agitated 16 l vessel (mechanical power input in vessel 1 W/l).

A solution of 35 wt.-% hydrogen peroxide in water and bromine (at a molar ratio of 1.1:1 H2O2:bromine) were mixed into 34 kg/h of the rubber solution at 45° C. using the a high-shear mixer. The amount of bromine added was in the ratio of 19 kg per ton of base rubber.

After a residence time of 20 minutes, sodium hydroxide solution was added to the reaction mixture to neutralize any residual hydrogen bromide, bromine and hydrogen peroxide and to adjust the pH-value to 9.5. The brominated butyl rubber cement was rinsed with water in a 1:1 mass ratio.

Antioxidants (irganox), stabilizers (paraplex) and calcium stearate were dispersed in the cement before steam injection was used to remove residual solvent. The resulting polymer was dried using a hot mill until less than 0.1% mass loss was achieved, and analyzed using proton NMR to determine the microstructure. The NMR results are tabulated below. Values are given in mol %.

| unchanged double bonds derived from 1,4 isoprene incorporation | exo-double bonds with bromine in allylic position |
|---|---|
| 0.60 | 0.80 |

The bromine incorporation into the polymer as determined by XRF was 18.0 kg/ton resulting in a bromine utilization of 94.7%.

What is claimed is:
1. A process for the preparation of cements comprising aliphatic medium and at least one brominated butyl rubber, the process comprising:
   a) contacting butyl rubber cement comprising aliphatic medium with elemental bromine in the presence of hydrogen peroxide in a continuous process to brominate butyl rubber contained in the butyl rubber cement and produce a heterophasic mixture comprising:
      a cement comprising aliphatic medium and brominated butyl rubber, and
      an aqueous phase; and
   b) separating the cement comprising aliphatic medium and brominated butyl rubber from the aqueous phase.
2. The process according to claim 1, wherein separating the cement from the aqueous phase comprises at least one of:

b1) adjusting the pH-valve of the heterophasic mixture to 6 to 13, and separating the cement comprising aliphatic medium and brominated butyl rubber from the aqueous phase; or b2) separating the cement comprising aliphatic medium and brominated butyl rubber from the aqueous phase, and washing the cement comprising aliphatic medium and brominated butyl rubber with an aqueous mixture.

3. The process according to claim 1, wherein the butyl rubber cement comprising aliphatic medium comprises:
   A) 5 to 30 wt-% of at least one butyl rubber,
   B) 0 to 6 wt-% of water,
   C) and an amount of an aliphatic medium comprising at least 50 wt-% of one or more aliphatic hydrocarbons having a boiling point of 45.0° C. to 80° C. at a pressure of 1013 hPa,
   wherein the sum of A), B) and C) adds up to 96 to 100 wt-% of the total content of the butyl rubber cement.

4. The process according to claim 1, wherein the butyl rubber cement is prepared in a process comprising:
   mixing an aliphatic medium comprising at least 50 wt-% of one or more aliphatic hydrocarbons having a boiling point in the range of 45° C. to 80° C. at a pressure of 1013 hPa, and a monomer mixture comprising at least one $C_4$ to $C_7$ isoolefin, at least one $C_4$ to $C_{14}$ conjugated diene, and either no, one, or more than one further co-polymerizable monomers, in a mass ratio of monomer mixture to aliphatic medium of 35:65 to 99:1 to form a reaction mixture;
   polymerizing the monomer mixture within the reaction medium to form a butyl rubber solution comprising a butyl rubber which is at least substantially dissolved in the medium comprising the aliphatic medium and residual monomers of the monomer mixture; and
   separating residual monomers of the monomer mixture from the butyl rubber solution to form the butyl rubber cement.

5. The process according to claim 3, wherein the butyl rubber comprises;
   repeating units derived from 92.0 to 9.5 mol-% of at least one $C_4$ to $C_7$ isoolefin and 0.5 to 8.0 mol-% of at least one $C_4$ to $C_{14}$ conjugated diene, or repeating units derived from
   i) at least one, $C_4$ to $C_7$ isoolefin,
   ii) 0.5 to 8.0 mol-% of at least one $C_4$ to $C_{14}$ conjugated diene, and
   iii) 0.1 to 20 wt-% of further co-polymerizable monomers,
   whereby the repeating units derived from i), ii) and iii) add up to 100 mol-% of the repeating units contained in the butyl rubber.

6. The process according to claim 5, wherein;
   the butyl rubber is a copolymer of isobutene and isoprene comprising 1.5 to 2.5 mol-% repeating units derived from isoprene;
   the aliphatic medium has a content of cyclic aliphatic hydrocarbons of less than 25 wt-%; and
   the hydrogen peroxide used is 25 to 60 wt-% aqueous solution.

7. The process according to claim 6, wherein the aliphatic medium has a content of cyclohexane of less than 5 wt-%.

8. The process according to claim 6, wherein the weight ratio of hydrogen peroxide to water within the reaction mixture formed by adding the hydrogen peroxide to the butyl rubber cement is initially greater than 0.05.

9. The process according to claim 1, wherein no surfactants are added.

10. The process according to claim 3, wherein:
    the elemental bromine is either added to the butyl rubber cement either in substance or as solution of elemental bromine in the aliphatic medium, or the elemental bromine is additionally or alternatively formed by reaction of hydrogen bromide or metal bromides or mixtures of hydrogen bromide or metal bromides as bromine precursors with the hydrogen peroxide in situ; and
    the hydrogen peroxide is added to the butyl rubber cement prior to, concurrently with, or subsequent to the addition of elemental bromine.

11. The process according to claim 9, wherein a quantity of bromine atoms as elemental bromine or bromine precursor or bromine and bromine precursor is 0.2 to 1.2 times the molar quantity of double bonds contained in the butyl rubber.

12. The process according to claim 9, wherein 0.6 to 5 mol of hydrogen peroxide per mol of elemental bromine is used, or if hydrogen bromide or metal bromides as bromine precursors are used, 1 to 5 mol of hydrogen peroxide per mol of bromide contained in the bromine precursors is used.

13. The process according to claim 1, wherein contacting the butyl rubber with bromine is done at a temperature of 0° C. to 90° C. for 1 minute to 1 hour.

14. The process according to claim 1, wherein during contacting of the butyl rubber cement with the bromine, the butyl rubber cement, the added hydrogen peroxide, and the bromine are agitated with a mechanical power input of 0.5 W/l or more.

15. The process according to claim 2, wherein the pH value is adjusted with a base that is an aqueous solution or slurry of alkaline or earth alkaline metal hydroxides or carbonates.

16. The process according to claim 2, wherein separating the cement comprising aliphatic medium and brominated butyl rubber from the aqueous phase is effected continuously in a separating apparatus comprising a settling section whereby the separation is supported by means of a coalesces.

17. The process according to claim 1, further comprising removing volatile components having a boiling point below 250° C. at 1013 hPa from the brominated butyl rubber to obtain the brominated butyl rubber in solid form.

18. The process according to claim 17, wherein removing volatile components is effected by a process using an extruder.

19. The process according to claim 1, further comprising curing the brominated butyl rubber.

20. The process according to claim 1 wherein in the brominated butyl rubber greater than 40% of the bromine atoms are in allylic position to exo-double bonds as measured by 1H-NMR with respect to the total bromine content of the brominated butyl rubber as measured by XRF.

* * * * *